United States Patent

[11] 3,609,583

| [72] | Inventor | Henri Brun<br>Paris, France |
|---|---|---|
| [21] | Appl. No. | 849,834 |
| [22] | Filed | Aug. 13, 1969 |
| [45] | Patented | Sept. 28, 1971 |
| [73] | Assignee | Thomson-CSF |
| [32] | Priority | Sept. 30, 1968 |
| [33] | | France |
| [31] | | 168,196 |

[54] ARRANGEMENT FOR CONTROLLING THE FREQUENCY OF A LIGHT SOURCE USING AN ABSORPTION CELL
4 Claims, 3 Drawing Figs.

| [52] | U.S. Cl. | 331/94.5 |
|---|---|---|
| [51] | Int. Cl. | H01s 3/00 |
| [50] | Field of Search | 331/94.5 |

[56] References Cited
UNITED STATES PATENTS

| 3,361,990 | 1/1968 | Gordon et al. | 331/94.5 |
|---|---|---|---|
| 3,431,514 | 3/1969 | Oshman et al. | 331/94.5 |

*Primary Examiner*—Ronald L. Wibert
*Assistant Examiner*—V. P. McGraw
*Attorney*—Cushman, Darby & Cushman ABSTRACT: An arrangement for controlling the frequency of a monochromatic light source, wherein said light wave is caused to propagate out and back through a cell containing a gas or a vapor having an absorption line and wherein the light wave is frequency modulated and feedback loop, between the frequency-controlling means of the light source and an output collecting the wave reflected through the said cell, is provided for monitoring the frequency of said light source.

PATENTED SEP 28 1971  3,609,583

ARRANGEMENT FOR CONTROLLING THE FREQUENCY OF A LIGHT SOURCE USING AN ABSORPTION CELL

The present invention relates to the control of the frequency of monochromatic light sources.

This kind of control is required, for example, in situations where a light source producing a very narrow spectral line, the frequency of which is adjustable, is being used, in particular if this frequency tends to drift either merely with time or as a consequence of some external phenomena. This is, for example, the case in arrangements requiring a high stability such as optical pumping apparatus where the said light source acts as a pumping source.

The invention is based upon an exploitation of the saturated absorption phenomenon which takes place when a gas or vapor is subjected to the action of a sufficiently high intensity light wave, the wavelength of which corresponds substantially to the wavelength of an absorption line in said gas or vapor.

According to the invention, there is provided an arrangement for controlling the frequency of a light wave produced by a monochromatic light source, comprising: a transparent cell containing a gas or vapor, having an absorption line substantially at the wavelength of said source and located on the trajectory of said light wave, reflecting means for reflecting said light wave back through said cell, upon propagation thereof through said cell and means for monitoring the mean frequency of said source as a function of the intensity of the reflected light wave, after passage through said cell.

For a better understanding of the invention and to show how the same may be carried into effect reference will be made to the drawings accompanying the ensuing description and in which.

The invention is based upon the phenomenon of saturated absorption of a monochromatic light wave by a vapor or gas whose absorption line corresponds to the wavelength of said light wave. In other words, if the light wave passing through said vapor or gas has a sufficiently high intensity, it saturates the capacity which said vapor or gas has to absorb luminous energy at said frequency.

Figure 1:
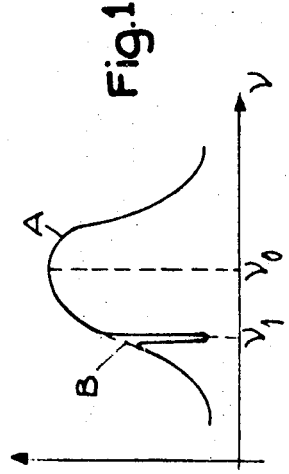
FIG. 1 is an explanatory graph.

In FIG. 1, a graph has been plotted illustrating this phenomenon. The curve A illustrates the variations, as a function of the frequency $v$, of the coefficient of absorption of a vapor or gas around the frequency $v_0$ of one of its absorption lines. As those skilled in the art will appreciate, this absorption line A has a certain width due to the phenomenon of line-spreading produced by the Doppler effect. If a monochromatic light wave of frequency $v_1$, having a sufficiently high intensity, propagates through said vapor or gas, it will saturate the capacity of said vapor or gas to absorb waves at his frequency $v_1$, and thus create a valley B (FIG. 1) in the spectral distribution of the absorption line, this phenomenon being referred to as the "Lamb dip." The gas or vapor atoms corresponding to this dip are those which have a certain velocity $v_1$ in the direction of propagation of the light wave, since $v_1$ is here less than $v_0$, the magnitude of the velocity $v_1$ being determined by the frequency interval $v_0 - v_1$.

The principle of the invention consists in exploiting this phenomenon by making the light wave which has propagated once through the vapor or gas propagate a second time therethrough in the opposite direction.

If the frequency of the light wave differs from the frequency $v_0$, during the return transit, the light wave will be absorbed by atoms having a velocity which is the opposite of that of those atoms which participated in the absorption during the outgoing transit. Accordingly, the light wave will create two dips which are symmetrical in relation to the frequency $v_0$, in the spectrum of the absorption line, and will undergo double absorption by the gas or vapor. On the contrary, if the frequency $v_1$ of the light wave is equal to the frequency $v_0$, during the return transit, the light wave will coincide with the dip which it produced in the outgoing transit, and will therefore suffer only one absorption.

Figure 2:
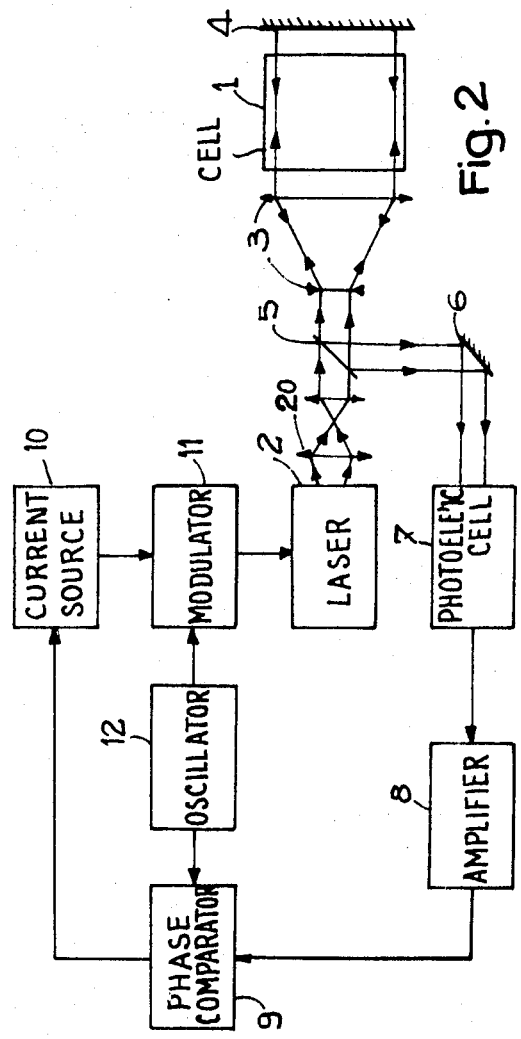
FIG. 2 shows a schematic diagram of the device according to the invention.

FIG. 2 shows diagrammatically a control device according to the invention.

It comprises a cell 1 filled with a suitable vapor or gas, a monochromatic light source 2 and a mirror 4. By way of example, the cell 1 may be filled with caesium vapor and the source 2 may be a semiconductor laser employing a gallium arsenide diode producing a very narrow frequency line, say in the order of 1 MHz., the wavelength of which corresponds substantially to that of the $D_2$ line in caesium, the width of which, due to the Doppler effect, may be about 500 MHz. An optical system 20 is arranged at the output of the laser 2 in order to produce a plane wave. An optical system 3 directs the emitted light wave through the cell 1. This wave is reflected by the mirror 4 back on itself. A semitransparent mirror 5 and a mirror 6 enable the reflected light wave to be directed onto a photoelectric cell 7.

The laser 2 is supplied from a variable current source 10, through a modulator 11. The latter receives the low frequency modulating signals produced by an oscillator 12. The signal produced by the photoelectric cell 7 is amplified by an amplifier 8 and transmitted to a phase comparator device 9 which also receives the signals from the oscillator 12. The error signal produced by the comparator 9 monitors the current source 10.

The operation of the system is as follows:

As explained hereinbefore, the light wave passing through the cell 1 is twice absorbed, except where its frequency is equal to $v_0$. With respect to the light wave reflected by the mirror 4, the vapor in the cell 1 behaves as a medium having the absorption curve illustrated in FIG. 3a. Accordingly, as far as the control loop is concerned, the arrangement operates as if one were scanning a very narrow line having a width corresponding to the dip centered on $v_0$, and not the normal absorption line of the vapor.

Figure 3:
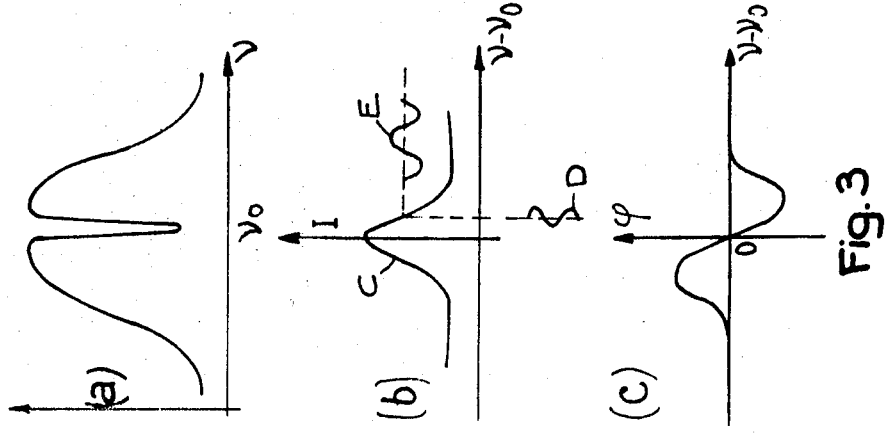
FIG. 3 illustrates other explanatory graphs.

The luminous intensity I, incident on the photoelectric cell 7, plotted as a function of the frequency of the light wave is given by curve C in FIG. 3b, the frequency scale having been greatly expanded as compared to that used in FIG. 3a.

The oscillator 12, by modulating, through the agency of the modulator 11, the current which supplies the laser diode 2, frequency modulates the light wave produced by the diode 2; this has been schematically illustrated by the curve D of FIG. 3b.

It will be seen that this frequency modulation produces (curve E) intensity modulation in the light received by the photoelectric cell 7, which is a function of the slope of the characteristic of the transmitted light intensity.

The cell 7 thus receives intensity-modulated light, the phase of which depends upon the interval between the central frequency $v$ of the light wave and the frequency $v_0$ of the absorption line, as illustrated in FIG. 3c. The phase comparator 9 thus produces an error voltage which is a function of this phase-shift and this voltage is applied to the control input of the current source 10 in order to cancel out the difference $v - v_0$. In this way, the frequency of the light source 2 is placed under the control of the frequency of the absorption line, with an extremely high degree of accuracy, since the accuracy of control is inversely proportional to the line width used as a standard, and since said line has an extremely narrow width compared to the width of the Doppler absorption line of the vapor.

Of course, the invention is in no way limited to the laser type referred to in the present example nor to this particular type of monochromatic light source. Again, it is equally possible to employ any other vapor or gas which has appropriate absorption lines.

What I claim is:

1. An arrangement for controlling the frequency of a light wave produced by a monochromatic light source, comprising: a transparent cell containing a gas or vapor, having an absorption line substantially at the wavelength of said source and located on the trajectory of said light wave; reflecting means for reflecting said light wave back through said cell, upon propagation thereof through said cell; and means for monitoring the mean frequency of said source as a function of the intensity of the reflected light wave, after passage through said cell.

2. An arrangement as claimed in claim 1, wherein said monitoring means comprise: first means for frequency modulating said source by a modulating signal; second means for controlling the mean frequency of said source; and third means detecting said reflected light wave to provide a detected signal and receiving said modulating signal for comparing the phase of said modulating signal and said detected signal and for supplying a control signal to said second means.

3. An arrangement as claimed in claim 2, wherein said first means comprise an oscillator generating said modulating signal and said third means comprise a photoelectric cell for receiving said reflected light wave and a phase comparator having two inputs respectively connected to said photoelectric cell and to said oscillator and an output for supplying said control signal.

4. An arrangement as claimed in claim 3, wherein said vapor is caesium vapor and said light source is a gallium arsenide laser diode.